United States Patent Office 3,475,560

Patented Oct. 28, 1969

3,475,560

TIME MULTIPLEX COMMUNICATION SYSTEM WITH PROVISION FOR PRIORITY ASSIGNMENT OF WAITING CALLS

Otto Kneisel, Gauting, and Horst Honold, Munich, Germany, assignors to Siemens Aktiengesellschaft, Munich, Germany Filed Sept. 22, 1965, Ser. No. 489,213
Claims priority, application Germany, Sept. 29, 1964, S 93,423, S 93,424
Int. Cl. H04j 3/12
U.S. Cl. 179—15 6 Claims

ABSTRACT OF THE DISCLOSURE

A time multiplex communication system in which different time-spaced pulse phases are assigned to calling stations and in which provision is made for priority assignment of calls to exchange positions and associated calling sets. When an exchange position becomes available for seizure, it is assigned to the demand for seizure of the highest class, which has been waiting the longest time.

CROSS REFERENCES TO RELATED APPLICATIONS

Figure 1A:
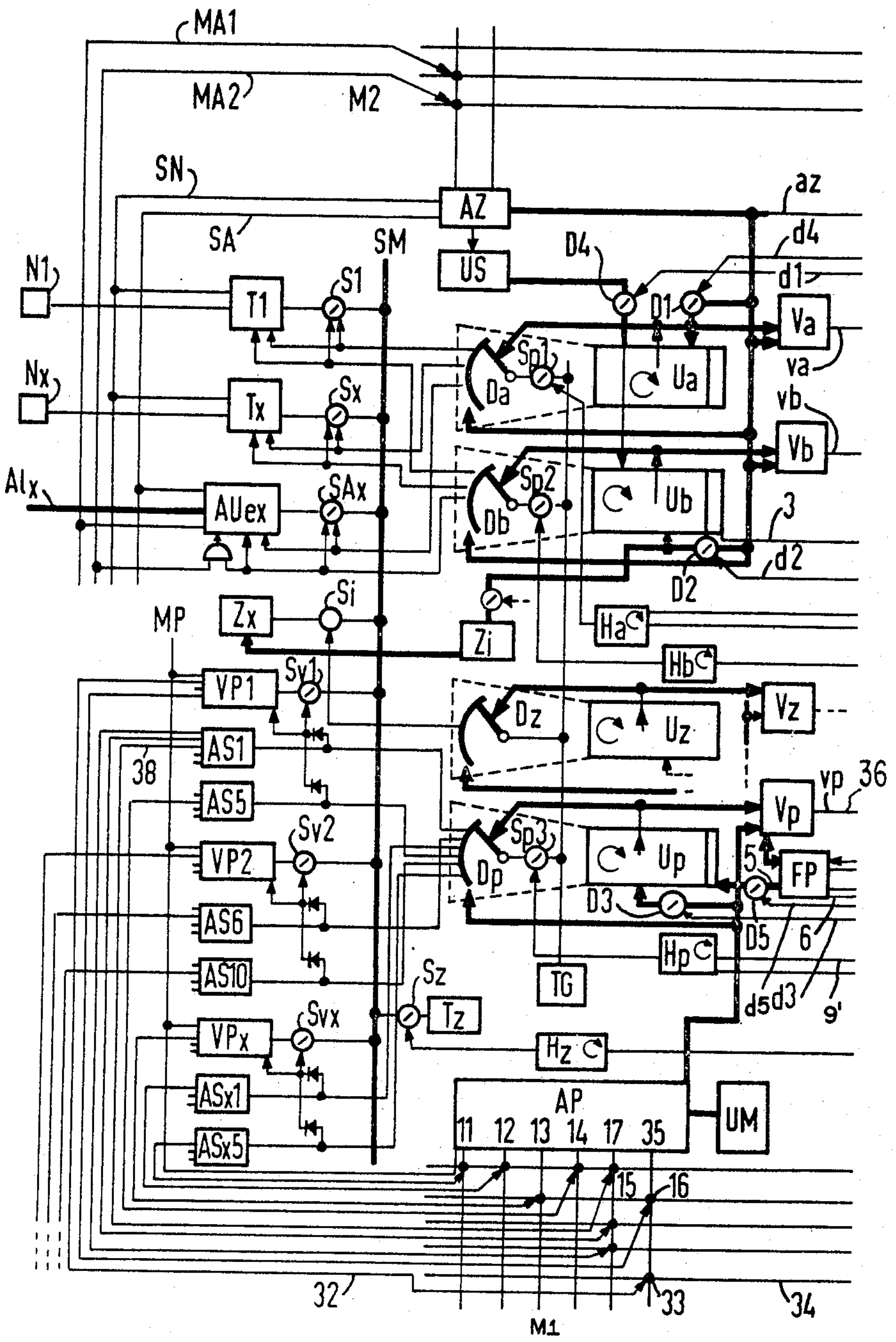

Applicants claim priority from corresponding German applications Ser. Nos. S 93,423 and S 93,424, both filed Sept. 29, 1964.

GENERAL DESCRIPTION

This invention relates to a time multiplex exchange system wherein time spaced pulse phases are assigned to the calling stations and determine the circuit processes for a connection, and further wherein the demand signal for seizure of an exchange position is transmitted to a central apparatus. More particularly, in such a system if the called connection station is an exchange position, as a switchboard or PBX position, then the calls designed for this exchange position should be made in any event, even when the exchange position itself is busy. For this purpose in the dial technique, the connection lines, such as trunk lines to a PBX installation, are held seized until an exchange place becomes free and a free signal is transmitted to the calling station for the period of waiting.

The object of the present invention is to guarantee the evaluation of the demand signals of the connection lines for seizure of a free exchange position, in an exchange system operating in accordance with the time multiplex principle, this all occurring in simple fashion through a central control apparatus.

The objective of the invention is accomplished through the fact that the central control apparatus transmits the command signal, in the same phase as the assigned pulse phase, to a special register which controls the connection of the free exchange position with the speaking multiplex line. This special register controls the establishment of connections to the exchange position. For this purpose, the connection arrangements and the delay line storage for calling and called speaking stations are not burdened with control functions. The ascertainment of the pulse phase identified in the demand register which is assigned to a connection line is sufficient for the central apparatus.

In accordance with the further development of the invention, the central apparatus responds to the command signal appearing in the assigned pulse phase and to a signal corresponding to the class of the circuit condition of the connection line, and provides as a result a combination or response signal which is transmitted to a special register. This special register first controls the connection of a waiting connection line with preferred circuit condition with the free exchange phase, over a speaking multiplex line. In this fashion, it is guaranteed that the connection lines emitting the demand signals are connected in the succession of precedence of the circuit conditions, to exchange positions as they become free. Registration of the conditions for each connection line is not required.

STATE OF THE PRIOR ART

In known exchange systems operating in accordance with the time multiplex principle, the pulse phases are either assigned individually to the connection stations, or the pulse phases are assigned to the connections which are established. In the latter arrangement, a connection between a calling station and a called station is established by means of a switch of a pulse phase assigned to the connection, over a speaking multiplex line or highway. There is assigned to each station participating in a connection a speaking switch for connection to the multiplex line. The actuation of this speaking switch in the pulse phase assigned to the connection path established takes place by a signal from a delay line storage device provided for each of calling and called stations. through operation of a decoder.

DESCRIPTION OF THE INVENTION

The invention will now be more fully described in conjunction with an operative embodiment thereof shown in the accompanying drawings.

Figure 1B:
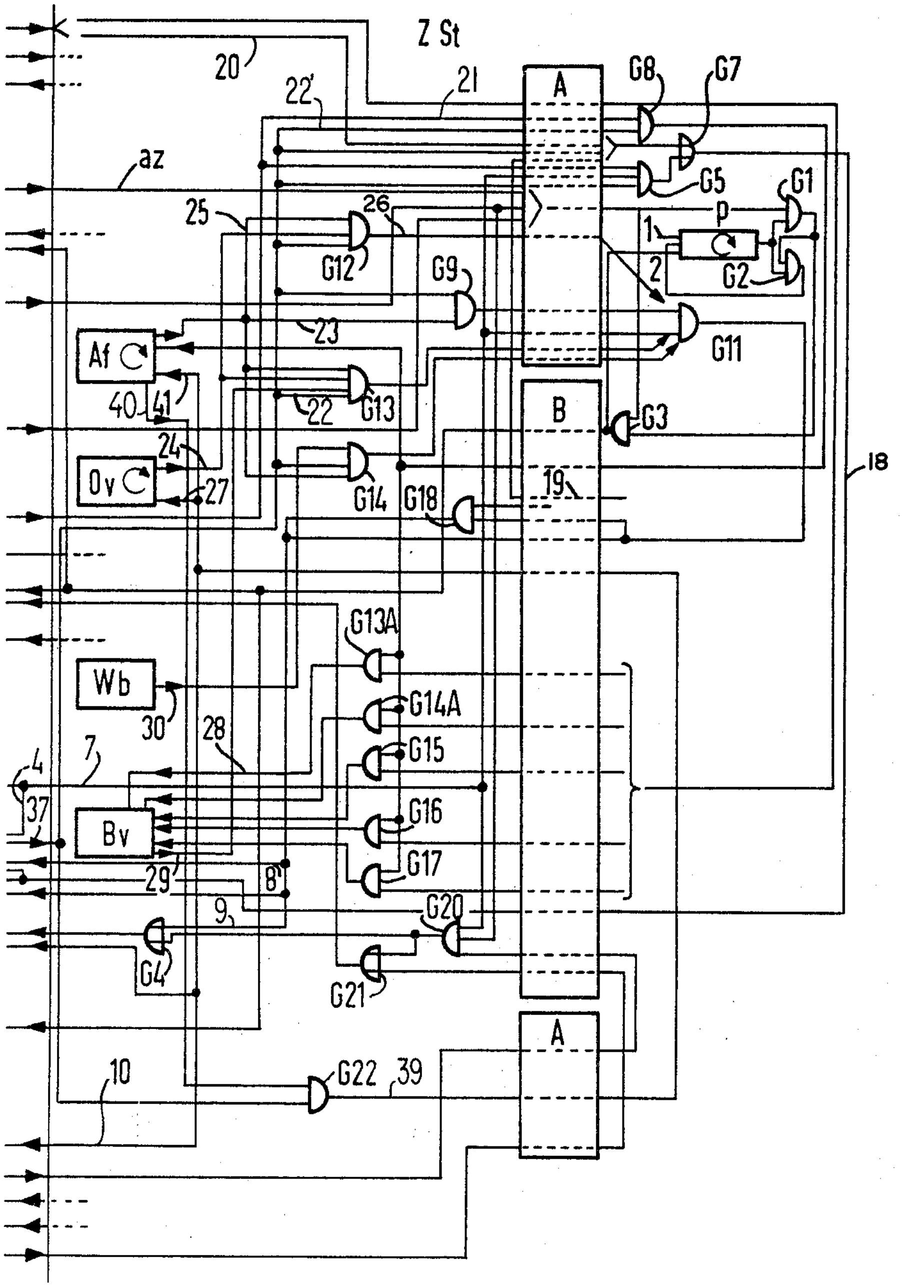

In the drawings:

FIGS. 1A and 1B are actually two portions of a single schematic drawing, connected to each other when arranged side by side, and showing an operative embodiment of the invention.

FIG. 1 shows the apparatus actually required, in its simplest form, for the establishment of connections to switchboard positions, or from operators at switchboard positions to extensions of the PBX, or to stations of the public exchange office, in a time multiplex telephone exchange. In the righthand portion of the drawing, namely FIG. 1B, there is shown a simplified representation of the gate and flip-flop circuits required in the central control apparatus ZS*t*, for the initiation of the necessary circuit processes. The gates shown in FIG. 1B are of the AND and the OR type, with the OR-type gate being shown with the input terminals extending through the semi-circular representation of the gate itself. In contrast, the AND or coincidence gates, are shown with the inputs terminating on the vertical input line of the gate.

The operative embodiment of the invention shown in the drawings is of a system in which both the controlling and the coupling together of the speaking paths occurs by the use of multiplex lines and in accordance with the time multiplex principle. However, the coupling together of the speaking paths can also take place by the use of space division or multiplexing, rather than time multiplexing. The central control apparatus specifically shown could also be quite different, within the scope of the invention.

The control processes which occur in the central control apparatus can take place upon the appearance of the appropriate address at the output of a corresponding signal generator, such as the address of the calling or called station, or of a calling set and switchboard position. These control processes may occur in different operating cycles which recur periodically at a rate dependent upon the number of stations to be served by the multiplex system, and the time duration of each pulse phase provided by that system. For instance, operating cycles can recur every 100 milliseconds in the case of a 1,000 address system for which each pulse phase is one microsecond long and for which each address is presented at the output of the appropriate generator for 100 microseconds, during each cycle. The operating cycle may follow an information cycle during which all of the 1,000 addresses are scanned every 100 milliseconds, to determine any change in condition of the stations corresponding to such addresses. In the event such a change has occurred, a control process can be instituted upon the address of the station appearing at the output of the appropriate signal generator, and completion of the information phase of that cycle. For instance, if a change occurred in the condition of a particular station, the apparatus would note such change when the address of that station was supplied by the appropriate signal generator during the next information cycle, and the control process to be accomplished by reason of such change would then take place in the control cycle following that information cycle.

The control processes of the central control apparatus ZS*t* could also be controlled independently of the phase cycles, as well as of the information and operating cycles; that is, the central control apparatus can operate in static fashion. In this type of arrangement, the central control apparatus will receive the information in static fashion and will emit commands in the same manner. These static commands can then be converted into commands in appropriate pulse phase. In such fashion the operation of the control processes for different circuit functions may be speeded up, since time is not unnecessarily lost between the several operating cycles which are otherwise necessary for the control process, as a consequence of the scanning and controlling operations for other speaking stations. The scanning of the addresses for changes in condition can then take place very much quicker, since such scanning is independent of the control processes. The operative embodiment shown in this application operates in accordance with this principle.

Referring to the middle top of FIG. 1A, the address generator AZ shown thereat supplies at its output, in cyclic fashion, the addresses of the speaking stations and trunk relay repeaters, of the system. The address generator AP, shown at the bottom of FIG. 1A, similarly supplies cyclically the addresses of the switchboard positions, as well as those of the calling sets, of the system. The address generator AZ provides a new address at its output every microsecond, so that in a cycle of one millisecond, 1,000 different addresses can be supplied at the output of generator AZ. Since fewer addresses are required to be supplied by the generator AP, as for instance 100 addresses in a one millisecond cycle, each address can be provided at the output of generator AP for the duration of ten microseconds.

The address generators are appropriately designed to ascertain changes in condition of the speaking stations in the transmission, or in the location, and in the event of such detection to transmit the address of the corresponding station with a demand signal to a special register A of the central control apparatus ZS*t*. These demands are then taken care of, one after the other, through operation of the central control apparatus.

In the apparatus shown in FIG. 1, the information signals emitted by the apparatus of FIG. 1A are evaluated in the central control apparatus ZS*t* shown in FIG. 1B. As a result of this evaluation, control signals are emitted by the control apparatus. In order that the central control apparatus ZS*t* may be simplified in showing, only the evaluating and command-emitting means which are important for the understanding of the invention are shown in the figure.

In FIG. 1A are shown the delay line storage devices U*a* and U*b* which are provided for storage and periodic emission of the addresses of the calling and called stations, respectively. These devices also serve the addresses of the trunk relay repeaters. The delay line storage device U*p* is shown toward the bottom of FIG. 1A and is provided for storage and periodic emission of addresses of exchange positions, together with the addresses of the calling sets for such switchboard or exchange positions. The delay line storage devices U*a* and U*b* for calling and called stations accordingly work in conjunction with the address generator AZ for calling stations, stations to be called and trunk relay repeaters. On the other hand, the delay line storage device U*p* for addresses of switchboard positions, together with addresses for calling sets, operates together with the address generator AP shown below it.

The addresses present at the outputs of the address generators AZ and AP can be provided to the corresponding delay line storage devices U*a*, U*b*, or U*p*, respectively, in the pulse phases assigned to the calling station, by way of respective switches D1, D2 and D3. These switches are controlled by the central control apparatus, in the pulse phase provided for the connection in question.

Comparators V*a*, V*b*, and V*p* compare the addresses present at the outputs of the respective signal generators AZ and AP, with those at the outputs of respective delay line storage devices. The comparator indicates identity between the two addresses and provides an output in the case of such identity. That is, when a particular calling station is identified at the output of signal generator AZ, and simultaneously at the output of delay line storage device U*a*, the comparator device V*a* will provide an output to the central control apparatus ZS*t*, and more specifically to apparatus A thereof in which the signal is temporarily registered, together with its pulse phase. Such registration is necessary since the central control apparatus, as explained above, operates in static fashion and does not follow the sequence of operation of the apparatus shown in FIG. 1A.

When the central control apparatus can take care of the switching process necessitated by the information supplied it, all information picked up in the same phase in apparatus A is evaluated and a command signal then given to apparatus B. The apparatus B emits the appropriate command in the phase assigned to the control process, whereupon the apparatus A receives new information which is evaluated during the same seizure period by the central control apparatus. If this new information does not require that new commands be given, the control process is terminated and the control apparatus is released.

The aforementioned delay line storage devices U*a*, U*b*, and U*p* also have assigned thereto respective decoders D*a*, D*b*, and D*p*, respectively. These decoders actuate associated speaking switches when certain addresses are present in the delay line storage devices in certain phases, actuation of those switches operating to connect the corresponding speaking stations identified by the addresses to the speaking multiplex line SM. However, the control for through-connection of the speaking switch occurs in dependence upon blocking switch S*p*1, S*p*2, or S*p*3, assigned to the respective decoders. These blocking switches are actuated to permit the speaking switches to be actuated, under control of pulses circulating in auxiliary registers H*a*, H*b*, and H*p*, respectively. As an illustration, the speaking switch S1 of a calling speaking station N1 may be controlled in pulse phase P1 by way of the blocking switch S*p*1. If the blocking switch S*p*1 is not operated in pulse phase P1, the corresponding speaking switch S*p* cannot be actuated to connect the speaking station N1 with the speaking multiplex line SM.

Adjacent the respective address generator AZ and AP are associated registers US and UM. These registers supply signals appropriate to the respective addresses, such as authorization signals, or addresses of stations to which calls are to be forwarded. For this purpose corresponding outputs may be provided from the associated register or converter.

In addition to the various other multiplex switches referred to above, there is provided a switch S*z* which is connected to a sound generator T*z*, with the switch being controlled by pulses received from the auxiliary circulating register Uz, this system being designed to put appropriate signals, such as dial signals, on the multiplex line in the appropriate pulse phases.

The speaking stations N1 to Nx, and the trunks Alx, with the associated trunk relay repeaters AUex, are controlled over the corresponding speaking switches S1 to Sx which are in turn operated by the decoders Da and Db. This control takes place in the pulse phase assigned to the calling station or line, so that the connection to the speaking multiplex line SM takes place in such pulse phase.

The switchboard or exchange positions VP1 to VPx are controlled by way of the decoder Dp. The through-connection of the switchboard positions to the speaking multiplex line SM takes place over speaking switches Sv1 to Svx, by operation of blocking switch Sp3, operated by the pulse phases registered in auxiliary register Hp. Calling sets AS1 to AS5, are assigned to an exchange position, such as position VP1, while calling sets AS6 to AS10 are assigned to position VP2, and calling sets ASx1 to ASx5 to position VPx. In the conventional technique these calling sets would serve to control the connection of an exchange position to a calling line. In the apparatus according to the invention, however, in the time multiplex system, the calling sets are only provided to control the signals which are to be switched on for the connections to be established, either departing from or arriving at the exchange position. The several calling sets provided for each position not only serve to make possible parallel control of signals for different connections for incoming and outgoing connections, but also for waiting connections which cannot be handled immediately by the operator, or for existing network connections, or for incoming connections established for charge notification.

Each subscriber N1 to Nx is provided with a subscriber circuit T1 to Tx. These subscriber circuits are interrogated by the address generator AZ, receiving from that generator, periodically, the addresses of the corresponding subscribers. In such case the subscriber circuit emits appropriate pulses corresponding to the loop condition of that circuit, to the address generator. The address generator then compares such pulses with the signals present for that particular subscriber circuit in the preceding cycle. If a change has occurred, the address generator AZ provides a demand pulse to the apparatus A in the central control apparatus, identifying the request for assignment of a free pulse phase.

The loop condition pulses from the subscriber circuits T1 to Tx are supplied to the address generator AZ over signal multiplex line SN. Corresponding pulses are provided for the same purpose from the trunk relay repeater AUex, over a corresponding signal multiplex line SA. Corresponding pulses from exchange positions VP1 to VPx are provided over the multiplex line MP and are similarly acted upon by the address generator AP, whereupon an appropriate demand is also provided to the apparatus A.

The apparatus B of the central control apparatus ZSt provides command pulses in the appropriate pulse phases to the matrices M1 and M2, resectively associated with address generators AP and AZ. These matrices provide the control signals to the trunk relay repeater (such as AUex), or to the exchange positions and calling sets, for identification of the required switching processes. The central control apparatus is only required for the carrying out of the control processes, when signals are picked up in the apparatus A, over the signal multiplex line. Since the central control apparatus operates in static fashion (that is, independently from the time multiplex cycle), the emission of a command from the central control apparatus in the appropriate phase is provided for by apparatus B.

The control of the switching processes in the calling sets and the exchange positions is described in more detail in the following. Matrix M1 and matrix M2 control different switching processes, in dependence upon the address generators AZ and AP, in dependence upon commands emitted through the central control apparatus ZSt to the corresponding trunk relay repeaters, exchange positions or calling sets, and through actuation of corresponding switching devices, such as relays.

The control apparatus ZSt consists essentially of gate and flip-flop circuits by means of which command signals are produced upon provision of certain input signals. These command signals may lead to the establishment of connections to the exchange position, for instance, or from the exchange position to a free exchange office repeater.

Before the details of operation of the system is further described, the cycle of operation of the pulse phases and the address generators will be described.

It was indicated earlier that the apparatus shown in the accompanying drawings provides for control of the associated PBX independently of the address generators. That is, the shown apparatus operates in the control function independently of information cycles and operating cycles. Then, a circuit process is completed for each address presented at the output of an address generator, assuming such a circuit process is necessary. Completion of a circuit process is considered to have occurred when the central control apparatus has been seized for a time greater than that necessary to complete that process. The circuit processes which can be completed are defined or determined in the control apparatus.

As indicated above, the address generator AZ operates in a one millisecond cycle and successively provides 1,000 addresses of speaking stations and trunk relay repeaters at its output. Similarly, the address generator AP provides 100 addresses for calling sets at its output, in a one millisecond cycle. The cycle of one millisecond length contains 100 successively-appearing pulse phases. Each phase has a length of one microsecond and recurs after 100 microseconds. The phase cycle and the address cycle are independent of each other.

Each calling station is assigned an individual pulse phase by the system, so that in the present system only 100 connections can exist simultaneously. If more connections are intended, then a second phase and a second address cycle, independent of the first cycle, is required. The connection of such two systems may occur through operation of speaking energy registers.

In the following there will be described the most important circuit processes of the apparatus of the invention, with the aid of certain examples. In all of the following examples, it will be assumed that there is an incoming call to the exchange office. In such case, the demand for the exchanged position may be brought about by:

A. Dialing of a special identification digit upon seizure by the calling speaking station of the repeater assigned to a connection line; or, B. The actuation of the flash identification relay of the trunk relay repeater, initiated by the PBX apparatus, in a priority connection; or, C. Actuation of switching devices of the repeater, through non-answer of the PBX connection within a certain period of time; or, D. Actuation of switching devices of the repeater by the busy condition of the desired PBX station, in a connection of high priority; or, E. Actuation of switching devices of the repeater through replacement of the receiver of the PBX station during a consultation connection; or, F. The absence of free pulse phases for automatic connection of a speaking station of the PBX; or, G. Any other circuit processes for initiation of a call provided for at the exchange position.

In case any one of the above-mentioned conditions occurs, switching devices in the trunk relay repeaters may be operated in known manner for identification of the demand for an exchange position. Such actuation will cause the trunk relay repeater to emit a pulse over the signal multiplex line SA. With such a demand signal present on signal multiplex line SA, the address of the demanding trunk relay repeater will be transmitted to apparatus A, however, without any particular pulse phase. The central control apparatus will assign the first free pulse phase to the trunk relay repeater AU*ex*. The further switching processes will then take place with the assigned pulse phase, such as P1. Such processes can include establishment of the connection with the exchange position, and transfer of the incoming exchange office call to the desired extension.

Assignment of the free pulse phase P1 takes place when the apparatus A requests such assignment of the central control apparatus, and when such pulse phase is free. The assignment can take place independently of other control processes, immediately, and with preference over such other processes.

The demand for the pulse phase is identified in apparatus A upon the absence of the demanding address in both of the delay line storage devices U*a* and U*b*, identified over conductors *va, vb* and *az*. In such case the first free pulse phase which appears in the delay line storage device P (extreme righthand side of FIG. 1B, adjacent apparatus A), controls the transmission of an impulse over the *d*1 conductor, over AND gates G1 and G3, upon the presence of the address of the trunk relay repeater AU*ex* at the output of address generator AZ. The switch D1 can then furnish this output of the address generator AZ (namely the address of the trunk relay repeater AU*ex*) to the delay line storage device U*a*.

Then the address of this repeater will circulate in the delay line storage device in the pulse phase assigned to it and will appear at the output of the storage device U*a* cyclically in this pulse phase. The delay line storage device U*a* for calling stations, as well as the corresponding storage device U*b* for called stations, may be of the type more fully described in Kneisel and Honold application Ser. No. 390,026, filed Aug. 17, 1964 (now Patent No. 3,366,741), and assigned to the same assignee as the present application. Other devices, such as the decoders, and the auxiliary storage devices, such as those identified at H*a*, H*b*, and H*p*, may be of the same types as the corresponding elements of the aforesaid Kneisel and Honold application.

Upon seizure of the pulse phase P1, that phase is cancelled in the register P by an output from the AND gate G3, supplied to the conductor 2 connected to the input of the circulating storage device P. The other free pulse phases are successively re-registered in the delay line storage device or register P, over AND gate G2.

Upon registration of the address of the seized trunk relay repeater AU*ex* in the delay line storage device U*a*, a pulse of phase P1 is also transmitted to the auxiliary register U*z* for control of switch S*z*, this pulse being provided from the output of gate G3. Similarly, a pulse of the same phase P1 is stored in the circulating auxiliary storage line H*a*, by connection to the same AND gate. The blocking switch S*p*1 is therefore cyclically operated in phase P1 so that the trunk relay repeater AU*ex* is connected over the speaking switch SA*x* in that pulse phase to the speaking multiplex line SM. Similarly, the sound generator T*z* is connected to the speaking multiplex line in the same pulse phase by operation of the switch S*z*, to provide dial tone to the repeater. This of course completes one circuit process for the control apparatus ZS*t*.

The subscriber of the public exchange office can now himself dial the desired extension of the PBX, or he can request connection to the operator of the PBX, through dialing of a special identification digit. The establishment of the through connection is not further described. However, the dial identification digits transmitted by the subscriber are transmitted over the speaking multiplex line SM to a prepared available digit receiver Z*x*, recoded or retransmitted from the trunk relay repeater in case such is necessary. The digit receiver Z*x* transmits the signals over receiver Z*i* to the delay line storage device U*b*, in the seized pulse phase P1.

A circuit process for the central control apparatus is completed after selection of each identification digit. After complete reception by the delay line storage device U*b* of the address of a speaking station to be called, the apparatus tests whether the desired station is free or busy. If it is free or available, then the through-switching of the connection occurs and this connection process is terminated. However, if the desired speaking station is busy, then the circuit process is either terminated upon switching a busy signal to the multiplex line, or upon registration of the demand for a free exchange position. The central control apparatus is in any case made available for new circuit processes.

In the following there will be described only the circuit processes which take place in connection with exchange activities through switchboard operators at exchange positions VP1 to VP*x*. For example, there will be described only the exchange activity of a PBX for the case of an incoming exchange office call, and not the through connection itself.

(1) Connections of incoming exchange office connections with an exchange position, by means of the free signal register F*p*

If the calling subscriber of the public exchange office dials the special identification digit which provides for call initiation to the exchange position, this digit is recognized as such in the digit receiver Z*x*, or, after the transmission thereof, in the delay line storage device U*b*. Upon recognition of the position identification digit, a signal is transmitted in the same pulse phase P1 over conductor 3 to apparatus A of the central control apparatus ZS*t*. This signal identifies the request for a free exchange position or switchboard position. However, in apparatus A this request remains present until the central control apparatus has taken care of requests that arrived previously and becomes free for operation upon the new request.

There are different possibilities for assignment of the exchange position. One possibility is that the exchange positions be identified only in a special register FP which operates as a generator. The addresses of exchange positions of course are continuously scanned by address generator AP and compared in comparator V*p* with the addresses of busy exchange positions, obtained from circulating storage device U*p*. If at its output the generator FP supplies the address of an exchange position which is identified as free or available by comparator V*p*, the generator FP is stopped by a pulse supplied over conductor 4 from the comparator. This identifies the free position. If this position is then seized, the generator is once more switched forward over conductor 6, until an identification of a free position is again provided at output 5.

The generator FP provides the identification of the free exchange position, in static form, at its output. If such a position is demanded, the switch D5 is operated and the address of the free position and the corresponding calling set is given to the delay line storage device U*p*, by generator FP.

When the signal recorded in the storage device U*b* indicates that a free exchange position is desired, an output is supplied over the conductor 3 to the gate G5 associated with the apparatus A, upon readiness of the control apparatus to act upon this demand. Similarly, the same gate receives over conductor 7 an indication of identity between the output of address generator AP and the output of U*p*, and over conductor 37, the output of signal register FP. The gate G5 acts upon this coincidence to supply a control pulse over conductor *d*3 to the switch D3, for transfer of the address of the free exchange position to the delay line storage device U*p*. At the same time, the address of a free calling set assigned to that free exchange position is necessarily given from the register FP. Since the gate G5 is also connected to the conductor 8, a pulse is provided over that conductor to switch forward the register FP and to provide at its output identification of a new free exchange position.

The conductor 9 is also connected in parallel with conductor 8, and a pulse of phase P1 is therefore supplied to the auxiliary delay line storage device H*p*, to cause actuation of blocking switch S*p*3 cyclically, in this pulse phase. As a result, the operation of the delay line storage device U*p* and the decoder D*p*, in the phase P1, actuate the speaking switch S*v*1 to connect the exchange position VP1 and the associated calling set AS1 to the speaking multiplex line SM in pulse phase P1.

The through connection of the exchange position VP1 to the speaking multiplex line SM can also take place in dependence upon an additional actuation of a pushbutton at the exchange position, in the same fashion as in conventional techniques. In such case the transmission of the pulse to the circulating auxiliary storage device H*p* may be dependent upon operation of this pushbutton.

Now, with the exchange position VP1 connected to the speaking multiplex line SM in phase P1, the operator at such exchange position can query the incoming seized exchange office line A*lx*, and therefore the subscriber of the public exchange which caused that line to be seized.

It is also possible to provide for operation of a calling lamp in a calling set AS1, by supply of a pulse over a control conductor 10 extending from the central control apparatus to the matrix M1, and upon there being present at the output of the address generator AP the address of the seized calling set AS1. As indicated, matrix M1 contains a number of crossing points, some of which are designated by the digits 11 through 16. Each crossing point identified by a circle contains a flip-flop circuit which may be placed in operation by control signals transmitted from the address generator AP and from the control apparatus. For example, if the output 17 of the address generator AP is assigned to the calling set AS1, and if a signal is provided in phase P1 over conductor 10 from the central control apparatus, then the flip-flop circuit at crossing point 15 is actuated and a permanent signal is switched on to conductor 38 by such actuation. Consequently, over conductor 38 the calling set AS1 is provided with voltage for operation of a relay which actuates the calling lamp.

It may readily be provided for in the calling set AS1 that the control relay is actuated, even though the control signals may last only for one microsecond. When the control relay is actuated, then the flip-flop circuit can be changed into normal position, for example through an acknowledgment signal from the controlled calling set. However, the transfer into normal position of the flip-flop circuit can also be caused by operation of a control signal provided upon termination of the condition to be signalled.

The assignment of a free exchange position can also be carried out without the register FP to identify the free exchange positions. This can occur through registration of the address of an exchange position in delay line storage device U*p*, upon the sensing of a command signal at gate G5, coincidence of that signal with a proper seized phase signal at gate G18, together with the supply of a corresponding signal identifying as free the address which is present at the output of generator AP, this signal being supplied at the output of comparator V*p*. In any case, the command pulse must be registered in the appropriate pulse phase.

A further possibility for operation without the free position register FP is in the use of an additional register which identifies the free condition of the address available at the output of the generator AP, which register is assigned to the generator and operates in parallel therewith.

If no exchange position is available, the demand signals are temporarily registered in a special register A*f*, shown in the upper left hand of FIG. 1B.

The demand for an exchange position over a seized trunk relay repeater can also take place in dependence upon other special circuit conditions, which have already been mentioned in an introductory fashion. For example, if the desired speaking station is found to be busy during the attempt to establish a through connection, switching devices may become effective in the trunk relay repeater to cause the demand for the exchange position. This may occur in the case of all incoming calls, or rather only in the case of special calls made over the trunk, such as long distance calls. The determination of the busy condition of the desired speaking station of the PBX can take place with the aid of the comparators V*a* and V*b* which will determine that the address of the desired station, which is present at the output of address generator AZ, is already stored in the delay line storage line U*a* or U*b*, in a different pulse phase than the phase (for example P1) assigned to the incoming seized trunk relay repeater AU*ex* in the delay line storage device U*b*.

The signal for the busy condition of the desired speaking station may be conducted, for example, over the output 19 of the apparatus B to the apparatus A, as a demand pulse. At the same time there may be provided a signal indicating that the trunk relay repeater is seized by a long distance call, this being indicated by matrix M2, over the conductor 20, upon simultaneous supply of the address of the trunk relay repeater at the output of the address generator AZ. If the generator FP simultaneously indicates availability of an exchange position, the connection to that position will be made in the same manner as caused by an output from AND gate G5, since these three-recited inputs are also supplied to OR gate G7, to which the output of gate G5 is supplied.

If a post selection digit is dialed by a PBX subscriber during an existing exchange office connection, and if this digit is picked up in the digit receiver and transmitted to the delay line storage device U*b* and recognized therein as a special post selection digit, a signal is transmitted to the central control apparatus ZS*t*, over a conductor corresponding to conductor 3, from the delay line storage line U*b*. In the fashion already described, a free exchange position (such as VP1) and a calling set (such as AS1) are thereby caused to be identified with the phase P1 in the delay line storage device U*p*.

If the subscriber of the desired speaking station does not answer within a certain period of time, then the notification condition is also not identified during this time period in the trunk relay repeater AU*ex*. Consequently, a signal for demand of the exchange position can also be transmitted with phase P1 over a signal multiplex line and the matrix M2 to the apparatus A, corresponding to the signal provided over conductor 20. This will be dependent upon time actuation of appropriate time-switching devices in the trunk relay repeater AU*ex*. The exchange position will then be switched on to the multiplex system in the manner previously described.

If a consultation connection is taking place over the trunk relay repeater AU*ex*, and if the consulting speaking station releases the connection by replacing the receiver, this circuit condition is identified in, for example, the trunk relay repeater AU*ex*. In this case, a signal is also transmitted from the repeater over the signal multiplex line and the matrix M2, in phase P1, to the apparatus A. This signal corresponds to the signal over conductor 20 and a free exchange position is switched onto the system in a manner previously described.

(2) Registration of the demand signal for an exchange position (A*f*), for incoming exchange office connections Connection of a trunk relay repeater which emits a demand pulse for a free exchange position can also be carried out without use of the special register FP for identification of the free exchange positions. In such case a special register for the receipt of the demand signals must be provided. This register is necessary for the reception and storage of demand signals even in the case of the use of the special register FP for identification of free exchange positions, when no free exchange positions are immediately available.

There were identified hereinabove six particular types of operation, these bearing the letters *a* through *f*. If, in any of these types of operation, a demand signal is given with a pulse phase assigned to the incoming seized trunk relay repeater, over conductor 21 to the apparatus A of the central control apparatus ZS*t*, and if all of the exchange positions are identified as being seized over conductor 22, through register FP, then these signals and the assigned pulse phase, such as phase P1, are registered in the apparatus A until the central control apparatus is available for this circuit process. When the central control apparatus becomes available, it provides for the emission of a pulse in pulse phase P1, over gate G8 and apparatus B. This pulse is provided to demand register A*f* in the pulse phase P1 and is cyclically provided by this register.

In the demand register A*f* the pulse phases of all the demand pulses are registered, one after another, in phase fashion in a delay time link. In this delay line storage the pulses therefore circulate in accordance with their respective phases. With the registration of a demand signal in the delay line storage device A*f* the switching process which is controlled through the central control apparatus is terminated for the trunk relay repeater involved. The central control apparatus is thereby released for the next control process.

The pulses picked up in the demand register A*f* are conducted continuously to the apparatus A of the central control apparatus. If an exchange position is signaled as being free at the output of register FP, an output is provided to the AND gate G22, from conductor 37. If simultaneously an output is available by way of conductor 40 from the demand register A*f*, the gate G22 indicates a coincidence, and a signal is provided over conductors 39, 41 to the calling register A*f*. The register A*f* then provides the first registered pulse phase of a phase cycle for further control of this process through the central control apparatus, over conductor 23. In the apparatus A the through connection process to the free exchange position is prepared over gate G9. As soon as the central control apparatus is ready, upon the presence of the address of the free exchange position at the output of generator AP, a signal is provided for transmission of the address of the position and of the free calling set assigned thereto, to the delay line storage device $U^p$. This signal is provided over the gate G11, and the apparatus B, in the corresponding pulse phase. The through-control of switch D3, over conductor *d*3, controls the transfer of this address in pulse phase P1. The register FP is then switched forward over the conductor 6 in the manner already described.

Upon reception of the address of the exchange position and the calling set in the delay line storage device $U^p$, the actuation of a calling lamp in the calling set AS1 is provided for over conductor 10, as already described hereinabove. Moreover, the pulse in delay line storage device A*f* for which the connection to the free position was made, is cancelled.

The demand register A*f* provides the demand pulses in the form of pulse phases of the same phase position as those assigned to the calling station which made the demand. This demand register can also carry out the connection of a waiting trunk relay repeater with a free exchange position, so that a control demand is provided in the same pulse phase over conductor *d*3 for registration of the address of a free exchange position and the corresponding calling set, in the delay line storage device U*p*. This operation will be dependent upon the identification of the exchange position and corresponding calling set as being free, through a corresponding signal upon conductor *vp*.

In every case the exchange position VP1 and the corresponding calling set AS1 are controlled over blocking switch S*p*3 and the exchange position is connected to the speaking multiplex line SM in the assigned pulse phase, such as phase P1.

(3) Scanning in the succession of arrival (order register O*v*), for incoming exchange office connection In the use of the demand register A*f*, the waiting calls are completed independently of the order of arrival thereof, but rather only in the succession of the phases as they appear in the cycle. However, if completion of the waiting calls is to be accomplished in the order of arrival, then a special order register O*v* may be provided. This register may contain a binary meter which assigns a binary ordinal number to each demand signal, that is, to each pulse phase of an incoming exchange office call to be transferred. For this purpose, delay line storage devices may be provided in number corresponding to the number of the principal ordinal numbers to be identified in code. If six delay line storage devices are provided, sixty-four ordinal numbers for waiting calls can be provided. If the first ordinal number is identified on wires one and four, and if the phase P1 is assigned to this first waiting call, then pulses are registered on wires one and four in this pulse phase. (It is here assumed that the wires referred to are the magnetostrictive type.) The incoming exchange office calls are then completed in the succession of the assigned ordinal numbers. Thus the call first arriving receives the coded ordinal number 1, the second receives the coded ordinal number 2, etc.

In such case the demand signals cannot become effective directly over line 23, but only over conductor 24 and gate G12, when the signal appearing at the output of the order register O*v* is not only of the call waiting the longest, but is also in accord with the pulse phase of the signal of that repeater waiting in the demand register A*f*. A signal is provided for the demand of a free exchange position only in the case of accord between the pulse phases of these two signals. Only in such case is a demand signal effective at the output 26 of gate G12, which signal is then transmitted to apparatus A. (In this case, it is assumed that the gate G12 has replaced the gate G9, those gates being alternative, as shown by the arrow at the input of gate G11. Gates G12 and G9 are, however, shown in one drawing in order that this application need not be unduly complicated by the use of several drawings.) The connection with the free exchange position can then be carried out in correspondence to the controlling operation over gate G11, in the manner described hereinabove.

Incidentally, when a dot or a period appears upon the termination of one of the inputs at a gate, it is thereby meant that this input is inverted.

The connection of the free exchange position with the trunk relay repeater which has been waiting the longest takes place upon registration of the address of the free exchange position in the pulse phase assigned to that trunk relay repeater.

A signal is also given over conductor 27 to the order register O*v* in order that new ordinal numbers may be assigned to the waiting trunk relay repeaters and the assigned pulse phases, in the order register. The pulse phases of the waiting trunk relay repeaters receive new ordinal numbers in order that they may be advanced by one place in each case in the succession of their arrival. In this manner only the pulse phase is effective at the output of the order register O*v* which is assigned to the repeater which has been waiting the longest.

The cancellation of the corresponding pulse phase in the demand register A*f* takes place over conductor 41.

(4) Questioning of incoming exchange office connections in the succession of their class and their arrival If the completion of the connection of the waiting trunk relay repeaters is to take place not just in the succession of arrival, but also in accordance with preference of certain high class calls, then a further special preference register Bv must be provided. (See the lower lefthand part of FIG. 1B.)

The preference register need contain only as many circulation or magnetostrictive wires as are necessary to provide for the binary identification of the several different classes of the connection lines which have not as yet been connected to the exchange positions. For instance, with three circulation wires, eight different classes of precedence can be provided for.

The identification of the classes of connections in register Bv can also occur in static fashion through operation of flip-flop circuits. The identification of the classes is accomplished in each phase cycle through the use of delay line storage devices. The cancellation of the class signals in the register Bv, if flip-flop stages are employed, takes place after each operating process of the central control apparatus which causes a through connection to an exchange position.

The following kinds of classes may be provided, for example: replacement of receiver in consultation calls, flashing the exchange position, local connections, long distance connections, and house connections. Indeed, these classes may be given the precedence indicated by their order in the above list, or any other appropriate order.

When each demand signal is registered in the demand register Af, a signal is also picked up in special register Bv, in dependence upon the class of service. Then, one of the gates G13 through gate G17 is controlled, depending upon the operation of the matrix M2 and the apparatus A, as well as the operation of the central control apparatus and the apparatus B thereof. The connections to, and operation of the gates G13 through G17 are indicated only in simplified fashion in the drawing. As an instance, if the call is a long distance call, the class signal is transmitted over gate G13 and conductor 28. The signal for the waiting call with the highest priority, for example, the long distance call, is switched to the output 29 of the special class register Bv.

The gate G13A actually will replace the gates G9 and G12, though all three gates are shown in the drawing in the interest of simplification. Upon the indication of the availability of an exchange position through operation of register FP, the gates G13A can be operated in phase P1, through signals connected at the output of the preference register Bv, as well as at the output of the special register Ov, and as well as also as at the output of register Af. Such signals can cause the demand signal for the trunk relay repeater having the call of highest class, and waiting the longest of such calls, to make a connection in the corresponding pulse phase, over the apparatus A of the central control apparatus. The connection of the repeater with the free exchange position will then take place in accordance with the manner already described for control processes using the gate G9.

There are two possible development forms of the apparatus, one employing registration of a demand signal in the demand register Af in the appropriate phase, and the other causing such registration statically. In the first development form, the pulse in the demand register Af is cancelled in both the demand storage register Af, and also in the class register Bv. In the second form, the corresponding flip-flop circuit is set on zero. The signal in register Ov is also cancelled.

The signal for the preference or class of the circuit condition of the connection line which has not been as yet connected to the position is picked up in the delay line storage device Ua, for calling speaking stations. This signal is then conveyed in like phase to the central control apparatus ZSt. The signals for precedence of the circuit conditions of the connection lines are then cancelled in special register Bv after each control process of the central apparatus ZSt. There are then again picked up in the delay line storage device, for the connection lines which have not yet been connected to the position, signals corresponding to the circuit conditions, from the delay line storage device Ua for calling speaking stations.

We will now describe the preferred handling of speaking stations which replace the receiver during consultation and speaking stations which emit flash signals to the exchange position, in connection with the above described connection of trunk relay repeaters to the exchange position, in dependence upon the class of the demands. In the event that a special register FP is provided and identifies the exchange positions which are free at the time, then the specially preferred demand signals can cause direct connection to a free calling set. In the event there is no free exchange position, the evaluation register Bv handles the preferential treatment.

(5) Changing preferential treatment for arriving trunk connections

It is also possible to provide a changing preferential treatment of the phases which successively lead to the establishment of a connection to the exchange position, by the use of demand register Af. As explained above, the demand signals picked up in the demand register Af, are completed in the succession of pulse phases P1 to P100, in the event order register Ov is not provided. However, if changes in preferential treatment are to be allowed, then an additional register Wb is necessary. The additional register commences in each phase cycle to connect the pulse phases successively at the output with a pulse phase different from that in the previous cycle. For instance, in one phase cycle the signals for the 100 pulse phases may appear at the output commencing with phase P10, successively. In the following phase cycle, the pulse phases may be supplied successively at the output of the special register Wb, beginning with another pulse phase, such as P20. In both cases, the cycle ends with pulse phases P10–1 or P20–1. The transposition of the connection of the pulse phase at the output of register Wb can be scrambled in any desired manner.

In this form of the invention it is assumed that only gate G14A is provided and that gates G9, G12 and G13A are not present. Again, all gates are nevertheless shown in the drawing, for simplicity in illustration.

A potential is provided to the gate G14 over conductor 30 beginning with a different pulse phase, in each cycle. Since the register Wb is placed in normal position with the pulse phase located in front of the first pulse phase of the cycle, it is guaranteed that in each testing process for establishment of a connection to a free exchange position, the demand register Af will still cycle through all of the 100 pulse phses. Yet it is also guaranteed with the special register Wb that, through changing of the pulse phase offered first in each cycle, a changing preferential treatment of the pulse phases successively leading to the exchange positions will necessarily come about.

The changing of the first phase can take place after each cycle, but also after each establishment of a connection to an exchange position.

So far we have only described demand signals which are provided in connections conducted over trunk relay repeaters. However, demand signals which originate from speaking stations of the PBX through appropriate dialing of special identification digits, may lead to the corresponding demands for a free exchange position VP, upon recognition in delay line storage device Ub. In the event no exchange position is then available, these demand signals also are picked up in the demand register Af, with the corresponding pulse phase. If the special register which signals preferential treatment is provided, then the in-house demands may be at a disadvantage as compared to the other demands. This disadvantage can be offset partially, for example by reserving special pulse phases for in-house exchange calls.

(6) Transfer of incoming connections

If the exchange operator (for example, of exchange position VP1) has entered into a speaking connection over the speaking switch S*v*1 in pulse phase P1 with the trunk relay repeater which is also connected with pulse phase P1 to the speaking multiplex line SM over the switch SA*x*, then the operator can question the exchange office subscriber. After questioning the subscriber, the operator of exchange position VP1 may operate, for example, an exchange pushbutton (not shown). In this fashion a signal is provided over a conductor 32 assigned to exchange position VP1 to a wiring point 33 which is assigned to the exchange position in the matrix M1, through identification of that exchange position at the output of register AP. Assuming the address of this exchange position is provided at this point at the output of the address generator AP, there is provided to the central control apparatus over conductor 34 an appropriate signal. At the wiring point 33 is arranged a flip-flop circuit which carries out the connection of the signal to the conductor 34, which leads to the central control apparatus. Through operation of this signal a cancellation pulse is transmitted to the auxiliary register H*a* over the apparatus A, the control apparatus and the apparatus B. This cancellation will be in phase P1 and, by reason by such cancellation, the blocking switch S*p*1 will no longer be actuated in phase P1, so that the trunk relay repeater AU*ex* identified in the delay line storage device U*a* in phase P1 will no longer be switched over speaking switch SA*x* to the speaking multiplex line SM.

The operator of exchange position VP1 dials the identification digit of the desired speaking station, so that the signal is transmitted over digit receiver Z*x* in a manner which need not further be described, over the converter Z*i*, to the delay line storage device U*b*, in phase P1. If the desired speaking station is free or available, then a pulse is also transmitted through the central control apparatus in phase P1 to the auxiliary register H*b*, this operation occurring upon switching of the address of the desired speaking station at the output of the address generator AZ. As a result, blocking switch S*p*2 is then operated in phase P1 and the desired speaking station, such as N*x*, is switched to the speaking multiplex line SM cyclically in the phase P1, over the speaking switch S*x*.

Now if the operator of exchange position VP1 again operates the exchange or transfer pushbutton, then the gate G20 once more operates to provide a pulse in phase P1 to the auxiliary register H*a*, as well as to cancel the pulse of phase P1 stored in auxiliary register H*p*. This occurs upon the presence of the signal of the exchange position at the output of the address generator AP, and upon the presence of a signal at the output of comparator V*p*, as well as at the output of comparator V*b*. Through this operation, a connection between the incoming seized repeater AU*ex* and the desired speaking station N1 is thereby established in phase P1, over the speaking multiplex line SM. The speaking switches S1 and SA*x* are then operated in phase P1.

It can be seen from the above that the through connection or prevention of through connection of corresponding stations to the speaking multiplex line SM can be carried out through appropriate cancellation or registration of pulse phases in the auxiliary registers H*a*, H*b*, and H*p*. This process prevents more than two speaking stations from being connected to the speaking multiplex line SM simultaneously. An undesired eavesdropping of the exchange office subscriber upon the establishment of the connection is thereby prevented.

It also can be seen from the above description that the speaking switches are only assigned to the exchange positions, and not to the calling sets. Thus, a switching on of the exchange office position to the speaking multiplex line over calling sets is not intended. As a result, speaking switches which ordinarily would be provided for each calling set, are not needed. The calling sets AS1 to AS15 only serve to identify the switching conditions of a line in the in-house and outside connections from the exchange position.

In the establishment of incoming exchange office connections, the transfer of non-authorized speaking stations is prevented by reason of the fact that the transmission of appropriate phase pulses to the auxiliary registers takes place only in dependence upon the authorization identification which is provided at the output of a delay line storage device US operating in parallel with the address generator AZ.

(7) Connections outgoing from the exchange position

The trunk relay repeaters can be divided into those which do and those which do not have meter means. This division may provide for the assignment of the trunk relay repeaters in outgoing exchange office connections. The assignment of a trunk relay repeater without a meter device, or a charge determining device, takes place by use of a pushbutton (not shown) assigned to a free calling set, and the assignment of a trunk relay repeater with charge determination takes place through actuation of a special pushbutton, assigned to a free calling set. The establishment of an in-house connection is initiated through operation of a further special pushbutton, by the exchange operator. In such fashion the PBX station receives dial tone and dials the address of the desired speaking station to the digit receiver which is then transmitted to the B register, rather than causing the seizure of a free trunk relay repeater.

An exchange position which established an outgoing connection receives a free pulse phase, which may be reserved for exchange positions, so that the identification of the position and the corresponding calling set may be stored in delay line storage device U*p*. The corresponding pulse in auxiliary register H*p* controls the speaking switch S*v*1. The establishment of the connection then takes place in known manner, as in the case of speaking stations to be called.

It will be evident that many minor changes can be made in the apparatus specifically disclosed hereinabove, without departure from the scope of the invention. Accordingly, the invention is not to be considered limited to the embodiments specifically described herein, but rather only by the scope of the appended claims.

We claim:

1. A time multiplex communication exchange system in which different time-spaced pulse phases are assigned to calling stations and such stations can demand seizure of exchange positions, over a multiplex highway, for connection of such positions to the highway in the same pulse phases, wherein the improvement comprises:

first means (FP) for storing only the identifications of free exchange positions, a demand register (A*f*) for storing the demands for seizure of an exchange position, in the pulse phase assigned to the demanding stations, and for supplying such pulse phases cyclically at its output, an order register (O*v*) for storing the order of placement of waiting demands, a class register (B*v*) for storing an indication of the highest class demand for seizure which is awaiting connection, and second means connected to said first means, said demand register, said order register and said class register for assigning a newly-available exchange position to the highest class demand which has been waiting the longest time.

2. The apparatus of claim 1, in which said order register is operable to assign to each waiting demand a code identification of the ordinal place in succession of arrival of the demand.

3. The apparatus of claim 2, in which said order register is operable to advance each said code identification by one ordinal position each time a newly-available exchange position is assigned to a waiting demand for seizure of an exchange position.

4. The apparatus of claim 1, in which said second means includes an address generator (AP) for cyclically and progressively furnishing at its output the addresses of the exchange positions, switch means (SV1–SV$x$) for each exchange position operable when supplied with a voltage pulse to connect its exchange position to the multiplex highway, storage means connected to said switch means (U$p$, D$p$, etc.), operable to store the address of each exchange position in the pulse phase in which that position was provided to the storage means, said storage means being operable to supply cyclical voltage pulses to each switch means for which it stores an address, in the pulse phase in which that address is stored, comparator means connected to said address generator and said storage means operable to supply an output only when the address then supplied by the address generator is not then stored in said storage means, and means operable to direct the current output of said address generator to said storage means in the pulse phase assigned to an incoming call directed to an exchange position, when said comparator means supplies said output, indicating that the exchange position of that address is not busy on an existing call.

5. The apparatus of claim 1 in which said class register is operable to store and cyclically supply at its output a pulse in the pulse phase assigned to the highest class demand awaiting connection after each assignment of a waiting demand for seizure of an exchange position.

6. The apparatus of any one of claims 1 through 5, including change means (W$b$) connected to said second means for changing the order of preference of the pulse phases of the waiting demands.

References Cited

UNITED STATES PATENTS

| | | | |
|---|---|---|---|
| 2,704,788 | 3/1955 | Wicks | 179—27 |
| 2,757,240 | 7/1956 | Gatzert | 179—27 |
| 2,819,345 | 1/1958 | Nilsson | 179—18 |
| 2,851,536 | 9/1958 | Galvin | 179—27 |
| 2,923,777 | 2/1960 | Schneider | 179—27 |
| 3,204,039 | 8/1965 | Adelaar et al. | 179—18 |
| 3,263,030 | 7/1966 | Stiefel et al. | 179—15 |
| 3,297,829 | 1/1967 | Germanton | 179—27 |
| 3,334,191 | 8/1967 | Arseneau et al. | 179—27 |

ROBERT L. GRIFFIN, Primary Examiner

CARL R. VONHELLENS, Assistant Examiner

U.S. Cl. X.R.

179—18.9